Nov. 25, 1969     E. R. WOODWARD     3,479,927

VEHICLE BRAKE OPERATOR

Filed May 19, 1967     3 Sheets-Sheet 2

INVENTOR.
ELMER RALPH WOODWARD

BY Gregg & Stidham

ATTORNEYS

INVENTOR.
ELMER RALPH WOODWARD

United States Patent Office 3,479,927
Patented Nov. 25, 1969

1

3,479,927
VEHICLE BRAKE OPERATOR
Elmer Ralph Woodward, Cloverdale, Calif., assignor to Wiz Corporation, San Francisco, Calif., a corporation of California
Filed May 19, 1967, Ser. No. 639,670
Int. Cl. F01b 29/00, 19/02, 30/00
U.S. Cl. 92—128                                2 Claims

ABSTRACT OF THE DISCLOSURE

A brake operator with an expansible chamber including a movable member connected to the vehicle brake means for actuation thereof between brake-applied and brake-released positions. The chamber is closed and contains a spring and capitive gas under pressure to urge the movable member toward the brake-applied position. Means are provided for introducing fluid under pressure to the other side of the movable member to move the same to the brake-released position.

This invention relates to a brake operator for vehicles such as buses, trucks, truck trailers, tractors, and the like. Although "air" and "air brake" are referred to for convenience, it will be understood that other compressible fluids, and in appropriate cases incompressible fluids (liquids), may be used.

A typical air brake system for a vehicle includes separate brake means such as a brake shoe and drum at the vehicle wheels, which brake shoes are actuated in one direction to apply the brakes and in the other to release the brakes. The brake means may serve as both service and parking brakes, and individual brake operators are located adjacent the wheels for actuation of the brake means. A typical brake operator includes a service brake unit by means of which the brakes are applied by application of air under pressure thereto. When the air is released, a resilient biasing means such as a light compression spring returns the service brake unit to brake-released condition.

Often a parking brake unit is attached to the service brake unit to form a part of the brake operator. Prior art parking brake units include one or more strong compression springs for actuation of the brake means to brake applied position. The parking brakes are released by application of air pressure to the parking brake unit to compress the strong compression springs. The large compression springs in the prior art parking brake units remain under pressure at all times and in a typical device may apply a spring force of several thousand pounds.

The use of such high compressive forces presents numerous problems in the manufacture, assembly and use of brake operators employing the same. Because of the large forces involved, the units are inherently dangerous and must be assembled and disassembled with great care. Often, a limited space is provided for the brake operator adjacent the wheels of the vehicle. To adapt the brake operators to the existing space, the springs often are operated in an overstressed condition. Overstressing greatly reduces the life of the spring. A weak or broken compression spring produces a very dangerous condition since the brakes are relied upon when parking and during emergency situations upon failure of the air pressure source.

With prior art spring-type operators the chamber containing the spring is vented to atmosphere to prevent a pressure build up within the chamber. The spring is there-

2 by exposed to air which may contain corrosive elements which further shorten the spring life. Sometimes filters are added to filter the air drawn into the spring chamber to reduce contamination, but such filters are subject to clogging and require frequent maintenance.

An object of this invention is the provision of a brake operator in which the above-mentioned shortcomings of prior art operators are eliminated.

An object of this invention is the provision of a brake operating mechanism in which the need for an overstressed compression spring is eliminated.

An object of this invention is the provision of a brake operating mechanism employing a compression spring which is isolated from the ambient atmosphere.

An object of this invention is the provision of a dual brake operating mechanism employing at least two different types of force producing means for application of the parking brake.

These and other objects and advantages of the invention are obtained by means of a brake operator comprising a closed expansible chamber including a cylinder and movable member therewithin. The movable member is adapted for connection to the brake means of the vehicle for actuation thereof between brake-applied and brake-released conditions. The closed expansible chamber contains a captive gas under pressure, and a spring biasing means, both of which urge the movable member toward the brake-applied position. The brakes are released by introduction of fluid under pressure to the other side of the movable member to move the same to brake-released position.

The above and other objects and advantages will become apparent from the following description when read in conjunction with the accompanying drawings. In the drawings, wherein like reference characters refer to the same parts in the several views.

Figure 1:
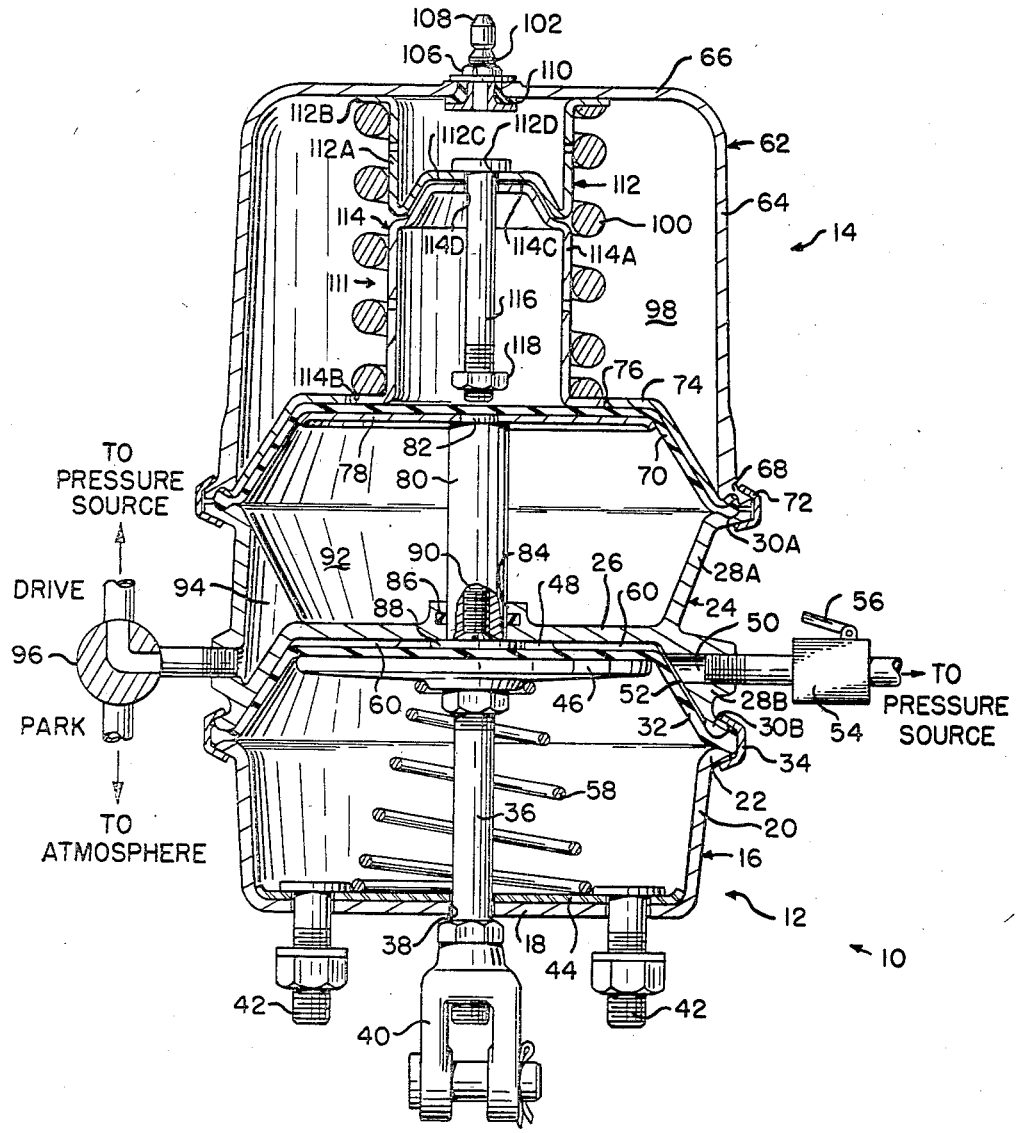
FIGURE 1 is a longitudinal cross sectional view of a brake operator embodying this invention.

Reference is first made to FIGURE 1 of the drawings wherein there is shown a brake operator 10 which includes a service brake unit 12 and a parking brake unit 14. The service brake unit 12 is substantially of well known construction and includes a dish-shaped case or housing 16 comprising an outer end wall 18 and side wall portion 20 formed with a radial flange 22 at the free end thereof. The open end of the case 16 is closed by an inner wall member 24 formed with an end wall 26 and upper and lower outwardly flared or dished, side wall portions 28A and 28B, respectively. Radial flanges 30A and 30B are formed at the free ends of the side wall portions 28A and 28B, respectively. The outer rim of a flexible diaphragm 32 is clamped between the flange 22 on the housing and the flange 30B by use of a conventional releasable clamping ring 34.

An axially movable brake actuating rod 36 extends through a clearance hole 38 formed in the end wall 18 of the case, the outer end of which rod is adapted for connection to a brake member such as a brake shoe at the wheel of a vehicle through suitable linkage including a clevis 40. Mounting studs 42 fixedly secured to the outer end wall 18 of the case through a reinforcing plate 44 are used to attach the unit to a bracket secured to the vehicle axle adjacent the brake to be actuated. Details of the connection of the operator to the brake means of a vehicle are well known and form no part of this invention.

The inner end of the brake actuating rod 36 is threadedly secured to a cylindrical-shaped diaphragm plate 46 which, in turn, is fastened to the flexible diaphragm 32. It will be seen that an expansible air chamber 48 is formed between the diaphragm 32 and inner end wall 26, which chamber is adapted for connection to a supply of air under pressure through a port 50 in the side wall portion 28B. A groove 52 is formed in the inner tapered surface of the wall portion 28B for communication between the port and the inner side of the diaphragm. The port 50 is adapted for connection to a source of air pressure through a service brake valve 54, which may comprise a modulating valve of conventional design and adapted for actuation by a foot pedal 56 under control of the vehicle driver.

The space at the outer side of the diaphragm 32 is vented to the atmosphere and a light compression spring 58 between the diaphragm plate 46 and end wall 18 serves to resiliently bias the brake actuating rod 36 to the brake-released position. In order to apply the service brakes, the pedal 56 is actuated to open the valve 54 for connection of the air pressure source to the chamber 48. When the chamber is pressurized the diaphragm 32, together with the attached brake actuating rod 36, is moved in an outwardly direction into brake-applied position. When the air pressure is vented from the chamber 48 upon return of the valve 54 to brake-released position, the diaphragm 32 is returned to the illustrated solid line position by the return spring 58 to release the brakes. Stop members 60 are formed on the inner wall member 26 for engagement with the diaphragm to limit the movement thereof in the brake-released direction.

The parking brake unit 14 includes a housing 62 comprising a generally cylindrical-shaped side wall 64 which is closed at one end by an end wall 66 and formed at the other end with a radial flange 68. The outer rim of a flexible diaphragm 70 is clamped between the flange 30A on the inner wall member 24 and the flange 68 on the housing 62 by use of a conventional releasable clamping ring 72. A diaphragm stop member 74 in the form of an inverted dish-shaped member formed with a large central aperture 76 therein also may be clamped between the flanges 30A and 68 at the upper side of the diaphragm 70 to prevent bulging of the diaphragm 70 when in the position illustrated in FIGURE 1.

A cylindrical-shaped diaphragm plate 78 is attached to the diaphragm 70, which plate has a push rod 80 attached thereto as by a reduced diameter end portion 82 press fitted in a central aperture in the plate. Obviously, other suitable means such as a screw fastener, welding, or the like, could be used to secure the push rod to the plate.

The push rod 80 extends through a central aperture 84 formed in the inner end wall 26, and a seal ring 86 in a groove in the aperture provides a fluid-tight seal between the wall and push rod. A pusher plate 88 in the form of a disc is secured by a screw 90 to the end of the push rod 80 within the chamber 48. When the diaphragm 70 is moved to the position illustrated in FIGURE 2, the pusher plate 88 engages the diaphragm 32 to move the same and the attached brake actuating rod 36 downwardly into brake-applied position.

A chamber 92 is formed between the diaphragm 70 and inner wall member 24, and the parking brake device 14 normally is maintained in the inoperative position illustrated in FIGURE 1 by application of fluid under pressure to said chamber through a port 94 in the upper wall portion 28A. The port 94 is connected to a parking brake valve 96 movable between "Park" and "Drive" positions. In the "Drive" position of the valve, as illustrated in FIGURE 1, a fluid, e.g., air, under pressure is supplied to the chamber 92 for movement of the diaphragm to the position shown in FIGURE 1. Upon actuation of the valve 96 to the "Park" position, the chamber 92 is vented to the atmosphere through the valve, whereupon the diaphragm 70 is moved to brake actuated position shown in FIGURE 2.

Movement of the diaphragm 70 into brake actuated position is accomplished by a combination of different means including captive gas under pressure in a closed expansible chamber 98 at the upper end of the diaphragm 70, and spring biasing means 100 within said closed chamber.

Figure 2:
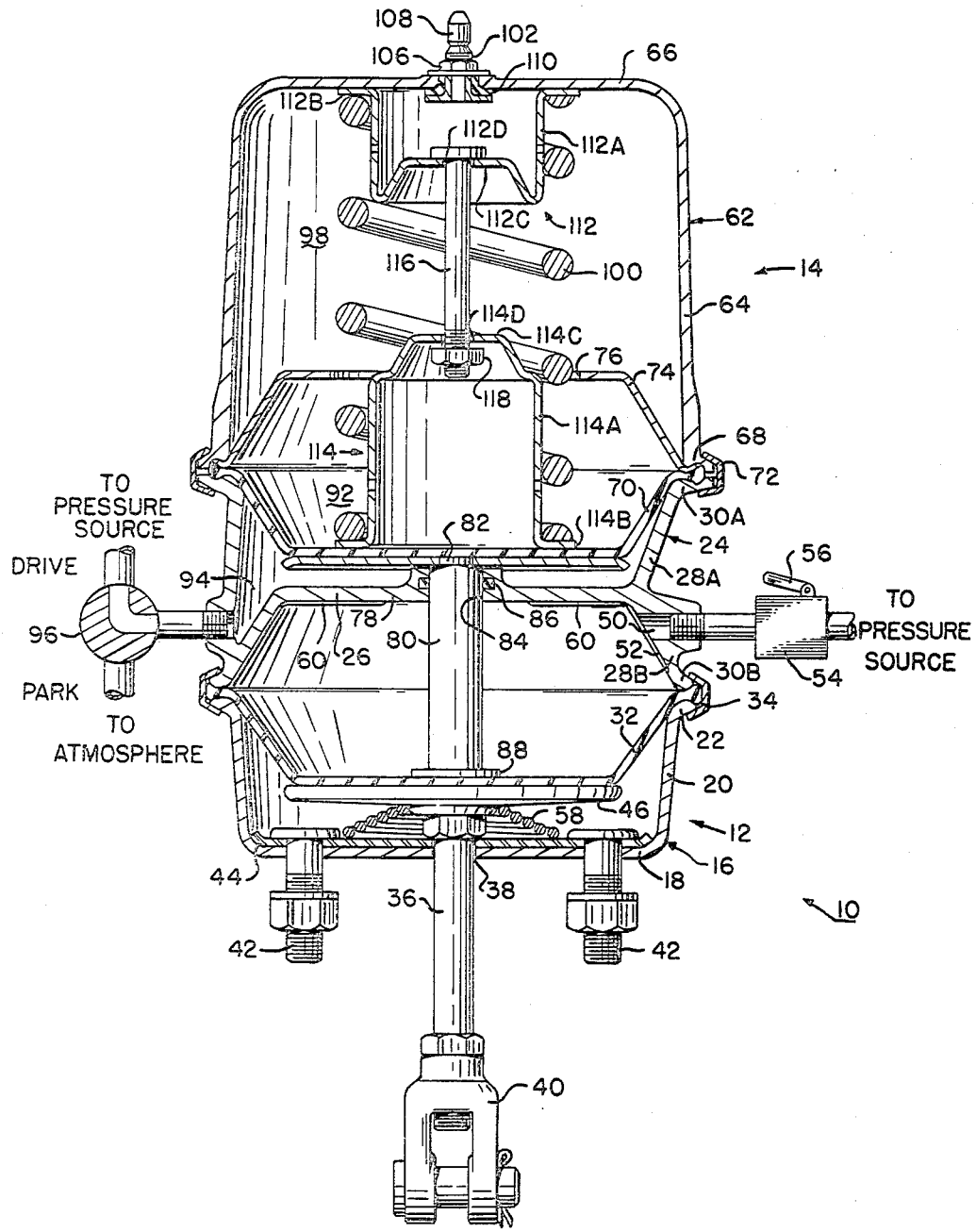
FIGURE 2 is a view which is similar to FIGURE 1 but showing the device in brake-applied condition by actuation of the parking brake unit.

A valve stem 102 extends through an aperture 104 in the end wall 66 of the housing 62 for pressurization of the chamber 98. The stem is provided with a retaining nut 106 and dust cap 108. When the nut 106 is tightened, a resilient washer-like member 110 of the valve stem is compressed to expand the same to provide a sealing engagement between the stem and housing. A conventional one-way valve, not shown, is included in the stem through which the chamber 98 is pressurized by means of a source of gas under pressure, not shown. In practice, the valve 96 is opened to vent the chamber 92 to the atmosphere and the chamber 98 is pressurized for movement of the diaphragm 70 to brake-applied position as shown in FIGURE 2. The pressure provided within chamber 98 is such that the combined force of the spring 100 and the captive gas under pressure acting on the diaphragm 70 provide the desired brake-applied force.

The ratio of the spring force to the force provided by the captive gas is not critical and may be selected as desired. With a strong spring 100 a relatively low closed chamber pressure may be employed, and with a weak spring a higher chamber pressure would be required for the same braking force. In one desirable arrangement the spring and captive air provide substantially equal force on the diaphragm 70 in the brake-applied condition shown in FIGURE 2.

A spring which is not overstressed may be used since the total spring force required is substantially less than that required of springs employed in conventional prior art arrangements. The spring life is thereby greatly increased. Also, since the spring is contained within a closed chamber in a controlled atmosphere, vulnerability to rusting, pitting and the like is substantially eliminated. Further, since the forces provided by the spring and the captive gas are substantially independent of each other the parking brake unit is substantially safe from total failure. With a failure of one force producing system (e.g., breakage of the spring 100 or leakage of the chamber 98) the other system would still function to provide a braking force. Of course, the parking brake force would be reduced to substantially one-half the normal maximum force with the failure of one of the systems. However, the parking brake would remain functional.

The operator 10 may be provided with a spring guide and abutment mechanism 111 comprising cup-shaped members 112 and 114 formed with cylindrical shaped walls 112A and 114A extending inside the coils of the spring 100. Flanges 112B and 114B are formed at opposite ends of the members against which ends of the spring 110 are seated. End walls 112C and 114C are provided at the facing ends of the members, and a connecting bolt 116 extends through apertures 112D and 114D therein. The mechanism 111 may be attached to the spring 100 and the nut 118 tightened to precompress the spring 100 prior to mounting the spring in the housing 62 during assembly of the operator. By pre-compressing the spring, the spring energy available during assembly and disassembly is reduced over arrangements in which no precompressing means are employed. During use, expansion and compression of the spring 100 is not limited or otherwise affected by the members 112 and 114 and attaching bolt 116 since the bolt is of sufficient length to preclude abutment of both the head of the bolt 116 and nut 118 with the members 112 and 114 when the operator is in the full brake-applied position shown in FIGURE 2. Also, the end walls 112C and 114C of the spring guide may be formed for interengagement in the brake-released position illustrated in FIGURE 1. In the illustrated arrangement the end wall 114C is formed with a conical-shaped protruding central portion which extends into the conical-shaped depression formed in the centeral portion of the end wall 112C in the brake-released position for axial alignment of the members 112 and 114.

Figure 3:
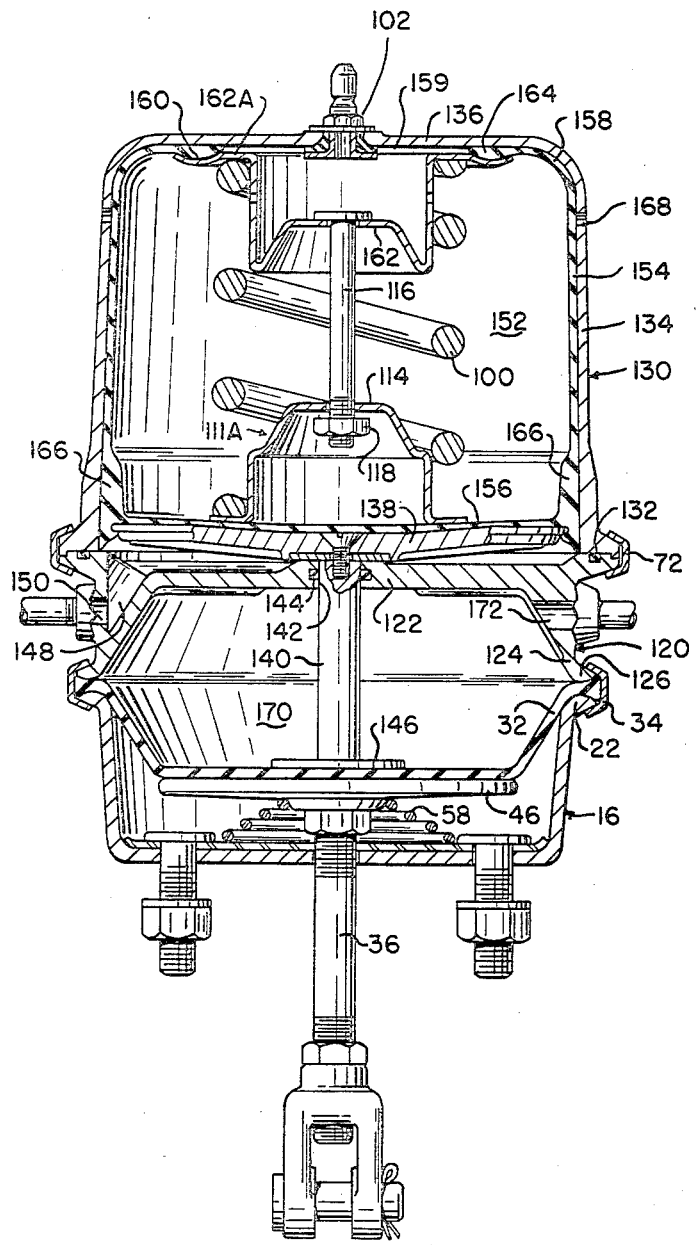
FIGURE 3 is a longitudinal cross sectional view of a modified brake operating mechanism which includes a bladder in the closed expansible chamber.

The invention is not limited to the use of the particular type closed chamber 98 shown in FIGURES 1 and 2 for containing the spring and compressed gas. For example, a modified form of brake operator employing a bladder is shown in FIGURE 3, to which figure reference is now made. The operator shown in FIGURE 3 includes a service brake unit comprising a housing 16 of the type shown in FIGURES 1 and 2, which housing is closed by an inner wall member 120 formed with an end wall 122, side wall 124, and radial flange 126 at the free end of the side wall. The outer rim of the service brake diaphragm 32 is clamped between the flange 126 on the member 120 and the flange 22 on the housing 16 by the clamping ring 34.

The parking brake unit includes a housing 130 comprising a cylinder closed at one end thereof by the inner wall member 120. The wall member 120 and cylinder 130 are clamped together by clamping ring 72, and a seal ring 132 provides a sealing engagement therebetween. The cylinder 130 is formed with a side wall portion 134 and generally flat head 136 at one end thereof. A valve stem 102 is provided at the head 136 for pressurization of the cylinder.

A piston 138 is reciprocably mounted in the cylinder 130, and a push rod 140 is attached to the piston by means not shown. The push rod extends through a central aperture 142 formed in the end of the inner wall 122, and a seal ring 144 thereat provides a fluid tight seal between the wall and push rod. A pusher plate 146 at the other end of the piston rod is adapted for engagement with the diaphragm 32 for movement of the diaphragm 32 and attached rod 36 to brake-applied position, as illustrated in FIGURE 3, upon operation of the parking brake. A chamber 148 is formed between the piston 138 and inner wall member 120, and the parking brake unit is normally maintained in the inoperative position, not shown, wherein the piston is moved upwardly to the opposite end of the cylinder 130, by application of fluid under pressure to the chamber 148 through a port 150. The port is adapted for connection to a source of fluid pressure through a valve which may be of the type designated 96 shown in FIGURE 1 and described above. In the brake-applied condition shown in FIGURE 3 the chamber 148 is vented to the atmosphere.

Movement of the piston 138 into the illustrated brake-applied position is accomplished by the combined force of the spring 100 and captive gas under pressure contained in a bag or bladded 152 within the cylinder 130 at the side of the piston 138 opposite the chamber 148. Bladders of various types which may be employed are shown in the co-pending patent application of Ernest C. Ike, Ser. No. 428,765, filed Jan. 28, 1965, now Patent No. 3,431,031 and applicant's co-pending application Ser. No. 626,536 filed Mar. 28,1967, both of which applications are assigned to the assignee of the present invention. Briefly, the illustrated bladder comprises a container which includes a generally cylindrical shaped side wall 154 having end walls 156 and 158 which abut the piston 138 and end 136 of the cylinder, respectively. A large opening 159 is formed in the end 158 of the bladder through which the spring 100 and associated mechanism may be inserted into the bladder during assembly.

A spring guide and abutment mechanism 111A, which is similar to the mechanism 111 shown in FIGURES 1 and 2, is included inside the bladder 154 for locating the spring 100 and providing abutments at the opposite ends thereof. The mechanism 111A differs from the mechanism 111 by the inclusion of a depression 160 formed in the flange 162A of the upper cup-shaped member 162. A bead 164 at the opening 159 in the bladder is seated in the depression 160 and the bladder is tightly clamped to the cylinder along the bead by force of the spring 100 through the abutment member 162. Also, radial movement of the abutment member 162 is prevented by engagement of the depression 160 with the bead 164. It will be understood that the mechanism 111A performs the same functions as the mechanism 111 and the additional function of sealing the bladder to the cylinder.

The illustrated bladder includes a fold control member in the form of a rib 166 inside the bladder adjacent the end 156 to facilitate inward folding of the bladder adjacent thereto when the piston 138 is moved upwardly upon pressurization of the chamber 148 through the port 150. Also, the end 156 of the bladder is formed with an integral seal member which engages the edge of the piston 138 to provide a sealing engagement between the piston and cylinder. Vent holes 168 adjacent the upper end of the cylinder 130 prevent air pressure build up between the bladder and cylinder in the event of leakage past the seal member. The above-mentioned features of the bladder and cylinder construction are described in detail in applicant's above-mentioned co-pending patent application and will not be repeated here.

The chamber 170 between the end wall member 120 and diaphragm 32 is connected to a source of gas pressure through a valve, not shown, and the port 172 for actuation of the service brake in the manner described above with reference to the embodiment shown in FIGURES 1 and 2. The parking brake unit is actuated by venting the chamber 148 to the atmosphere, whereupon the combined force of the spring 100 and captive gas under pressure within the bladder 152 urges the piston 138 to the illustrated brake-applied position. The parking brake is released by admitting fluid under pressure to the chamber 148 to move the piston 138 to the upper end of the cylinder 130 to compress both the spring 100 and captive gas within the bladder.

The embodiment shown in FIGURE 3 provides the same advantages over prior art arrangements as provided by the arrangement shown in FIGURES 1 and 2. As mentioned above, such advantages include the fact that the parking brake unit operates with a combination of spring and gas pressure forces, whereby a failure of one force producing means merely reduces the performance of the parking brake without totally disabling the same. Further, the spring is protected from ambient conditions by the enclosure thereof within a closed chamber containing captive gas under pressure.

The invention having been described in detail, various other changes and modifications may suggest themselves to those skilled in this art. For example, a plurality of coil springs may be used in place of the single spring 100 within the captive gas chamber. It is intended that this and other such changes and modifications shall fall within the spirit and scope of the invention as defined in the appended claims.

I claim:

1. A brake operator for actuation of vehicle brake means between brake-applied and brake-released conditions, said operator comprising:
    a closed expansible chamber including a housing and member reciprocably movable in the housing,
    means for connecting said reciprocably movable member to said vehicle brake means for actuation thereof,
    captive gas under pressure maintained entirely within said closed expansible chamber at one side of the movable member,
    spring biasing means within said closed expansible chamber at one side of the movable member,
    said captive gas under pressure and said biasing means urging said reciprocably movable member in one direction for application of said brake means, means for introducing fluid under pressure to the other side of said reciprocably movable member to move the same in the other direction for release of said brake means, said closed expansible chamber including a resilient bladder within the housing enclosing said captive gas and spring biasing means with one end abutting the movable member and an opposite end formed with an aperture therein closed by the housing, and a spring guide and abutment mechanism comprising first and second members with portions abutting opposite ends of the spring, one of the members of said spring guide and abutment mechanism including a portion abutting the bladder adjacent the aperture therein for urging the bladder against the housing adjacent the aperture to provide a sealing engagement thereat.

2. The brake operator as defined in claim 1 including means attached to said first and second members of the spring guide and abutment mechanism for loosely connecting the same when mounted in the bladder, and for maintaining the spring in compressed condition when the spring is removed from the bladder.

References Cited

UNITED STATES PATENTS

| | | | |
|---|---|---|---|
| 134,645 | 1/1873 | Culmer | 267—34 |
| 924,913 | 6/1909 | Mellen et al. | 267—34 |
| 1,655,201 | 1/1928 | Stevens | 267—34 X |
| 1,772,387 | 8/1930 | Dickerson | 267—34 X |
| 2,479,454 | 8/1949 | Annin | 92—134 X |
| 2,618,907 | 11/1952 | Pritchett | 92—40 X |
| 2,754,805 | 7/1956 | Beman | 92—128 X |
| 3,064,685 | 11/1962 | Washnock et al. | 92—63 X |
| 3,090,359 | 5/1963 | Hoppenstand | 92—64 X |
| 3,248,879 | 5/1966 | Natho | 92—134 X |
| 3,359,869 | 12/1967 | Avrea | 92—63 |

FOREIGN PATENTS

| | | |
|---|---|---|
| 1,033,165 | 7/1958 | Germany. |
| 204,098 | 9/1923 | Great Britain. |

MARTIN P. SCHWADRON, Primary Examiner

IRWIN C. COHEN, Assistant Examiner

U.S. Cl. X.R.

92—64, 92, 130, 134